G. FRAME.
FRINGING ATTACHMENT FOR SEWING-MACHINES.
No. 175,064. Patented March 21, 1876.
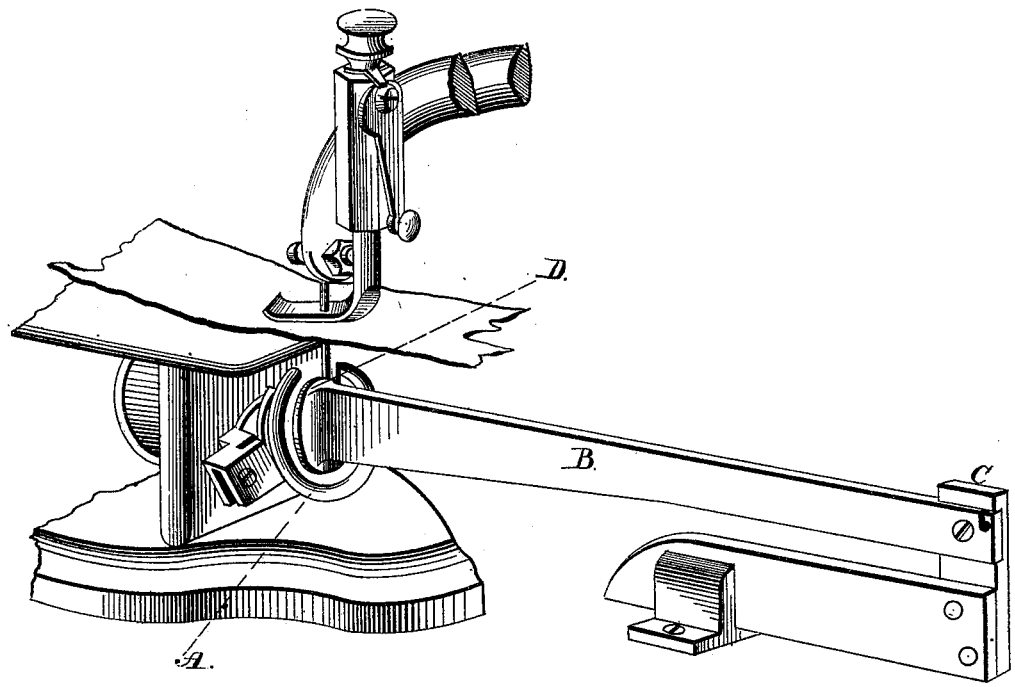

UNITED STATES PATENT OFFICE.

GIBBONS FRAME, OF PHILADELPHIA, PENNSYLVANIA.

IMPROVEMENT IN FRINGING ATTACHMENTS FOR SEWING-MACHINES.

Specification forming part of Letters Patent No. 175,064, dated March 21, 1876; application filed January 10, 1876.

*To all whom it may concern:*

Be it known that I, GIBBONS FRAME, of the city and county of Philadelphia, and State of Pennsylvania, have invented a new and useful Improvement in Fringing Attachments for Sewing-Machines; and I do hereby declare the following to be a clear and exact description of the nature thereof, sufficient to enable others skilled in the art to which my invention appertains to fully understand, make, and use the same, reference being had to the accompanying drawings, making part of this specification, in which the figure is a perspective view.

My invention consists in new and useful means for forming fringe. I employ a looping-hook and a guide, on which the loops of the fringe are formed and supported without liability to entangle or catch on any part of the machine.

Referring to the drawings, A represents a looping-hook of a sewing-machine of the order known as Wheeler & Wilson; but other machines, by proper alterations, may be employed for my purpose, said hook operating and forming loops in the usual manner. B represents a guide and support for the loops as formed. For this purpose the guide consists of a bar, which is elevated by means of a standard, C, secured to the outer end of the bar, and the inner end of the bar carries a head, D, which is arranged adjacent to the hook A, so that as the loops are formed by the hook they pass over the head D on the bar, and instead of being carried up and tightened against the fabric, they are held by the under side of the bar, and consequently formed into loops or fringe, the bar extending unbroken or unobstructed from the head D to the standard C. The formed loops or fringe pass along the bar toward their outer end, and when a sufficient quantity is made they will be removed from the bar.

It will be seen that the inner end of the bar B is free, and the loops pass freely from the looping-hook, are in no wise obstructed, cannot entangle with any adjacent parts of the machine, and thus cannot strain the fabric to which they are attached. The head D prevents return of the loops in the direction toward the looping-hook. It will be seen that the bar B may be brought up against the hook A, and, owing to its support at its outer end, said bar may be of considerable length without danger of dropping from its position, and fabrics or articles of great length may be fringed.

I am aware that fringing-machines have been constructed in a variety of forms.

Having thus described my invention, what I claim as new, and desire to secure by Letters Patent, is—

The looping-hook A, in combination with the bar B, formed with a head, D, at its inner end, and a supporting-standard, C, at its outer end, substantially as and for the purpose set forth.

GIBBONS FRAME.

Witnesses:
JOHN A. WIEDERSHEIM,
H. E. HINDMARSH.